June 29, 1965     C. E. PORTER     3,192,282
AMMONIA RECOVERY PROCESS FOR CAA PRETREAT UNITS
Filed April 24, 1961
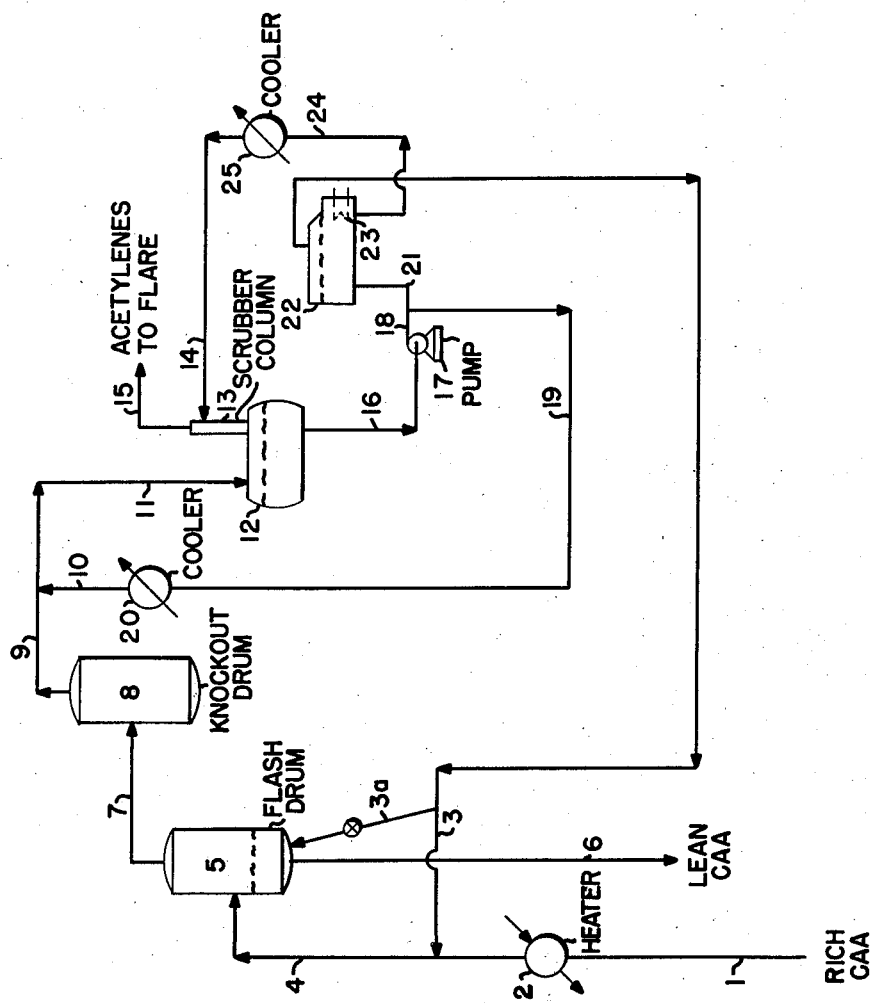
Carter E. Porter     Inventor
By Frank A. Sinnock
Patent Attorney

United States Patent Office 3,192,282
Patented June 29, 1965

3,192,282
AMMONIA RECOVERY PROCESS FOR CAA PRETREAT UNITS
Carter E. Porter, Cranford, N.J., assignor to Esso Research and Engineering Company, a corporation of Delaware
Filed Apr. 24, 1961, Ser. No. 104,859
7 Claims. (Cl. 260—681.5)

The present invention relates to an improved cuprous ammonium acetate (CAA) pretreat process for the removal of acetylenes from $C_4$–$C_6$ diolefins or from $C_2$–$C_6$ olefins. More particularly this invention relates in such a process to an improved method for scrubbing the overhead vapors from the acetylene stripper to recover (and concentrate for recycle) the ammonia stripped overhead with the acetylenes. Yet more particularly, this invention relates to passing the fat ammonia water mixture from the bottom of the ammonia scrubber to a single stage flash vaporization wherein only a part of the ammonia is desorbed overhead and wherein the liquid ammonia water mixture remaining (containing above about 3 mol percent ammonia) is recycled to the top of the ammonia scrubber. Most particularly, this invention relates to passing at least a portion of the concentrated ammonia vapors from the single stage flash vaporization back to the acetylene stripper to be used as the stripping gas therein. Finally, in a preferred embodiment this invention relates to adjusting the conditions in the single stage ammonia flash concentration so that the vapors flashed overhead have an $NH_3$ concentration equal to the vapors in equilibrium in the acetylene stripper, thus maintaining the ammonia concentration of the CAA mixture constant at the desired level.

Processes for prewashing butadiene-bearing streams for elimination of acetylenes therefrom are well known in the art, i.e. see for example U.S. 2,847,487. In a typical pretreat process a butadiene-bearing stream, containing substantial amount of butenes and trace or minor amounts of acetylenes, is contacted with a selective solvent such as aqueous cuprous ammonium acetate (CAA), utilizing high ratios of hydrocarbon feed to solvent. By such a pretreat or prewash substantially all of the acetylenes are absorbed (or extracted) along with only minor amounts of butadiene and other components. The pretreated butadiene-bearing stream, substantially free of acetylenes, is then passed to a main butadiene extraction plant. The extract from the prewash stage in the prior art processes containing acetylenes and butadiene is first desorbed of most of the butadiene by heating and then is desorbed of acetylenes and the remaining butadiene by higher temperature heating to break the CAA-acetylene complex and/or stripping, preferably with $NH_3$, thus leaving a substantially lean CAA solvent for recycle to the prewash extraction stage. In this latter desorption ammonia also is desorbed overhead with the acetylenes and the acetylenes are scrubbed with water to selectively recover the ammonia for recycle.

The present invention greatly simplifies ammonia recovery in the conventional CAA pretreat process for the removal of acetylenes from butadiene particularly, where, as of late, this process is used to obtain acetylene concentrations below about 500 p.p.m. The following savings are obtained: (1) Reduced equipment and utilities costs, (2) reduced fouling of the $NH_3$ recovery tower allowing longer onstream periods between shutdowns, and (3) elimination of the necessity for using open steam and caustic in the ammonia concentration step. These savings are more fully discussed below.

Prior to the present the recovered ammonia from the ammonia scrubber was ordinarily passed to a common ammonia recovery fractionator for both the pretreat and the main butadiene sections (where ammonia is lost overhead with the desorbed butadiene and is recovered by water scrubbing of the butadiene vapors). This resulted in considerable problems since the small amounts of acetylenes also picked up in the scrubber contaminated that part of the ammonia which was recycled to the main butadiene extraction section. This could be avoided by using separate ammonia recovery fractionators for the pretreat and main butadiene recovery sections but the expenses involved are large and additionally the problems of fractionation fouling described below are not avoided. In the prior art system most of the ammonia was recovered in the ammonia fractionator before the water stream was recycled to the ammonia scrubber. Thus, the water passed to said scrubber contained about 0.1 mol percent of ammonia. It has now been found that a fractionator for the pretreat section may be replaced by a simple flash drum thus reducing equipment costs for a 25,000 T./Year unit by about $50,000. Additionally, the cooling and preheating which would be required in connection with the said column is reduced by about $50,000 per year.

Further, in the prior art system problems have been encountered due to the presence of small amounts of acetylenes in the fat ammonia solution sent to the ammonia fractionator. These acetylenes tend to foul the fractionator at the condenser and at the bottom of the tower and the shutdowns thereby caused have been a costly operating problem. The present process, by utilizing a single stage flash drum rather than a tower, eliminates these problems. Thus, in the present system there is no condenser and additionally, since the lowest concentration of ammonia in water is relatively high, e.g., 5%, the amount of acetylene polymer plating out is greatly reduced.

A further advantage of the present process is that it is not necessary to utilize open steam to protect against copper plating out in the reboiler of the fractionator in the event of a carryover of CAA solution (i.e. copper will not plate out from CAA solution and corrode steel where the ammonia concentration in the water is higher than that in the CAA). Additionally, in the prior art system where open steam is used, addition of caustic to the tower is also required since at the low concentrations of ammonia prevailing in the bottom of the tower and in the reboiler very corrosive conditions result from carbonates formed from the $CO_2$ in the steam. Thus, both open steam and caustic addition are eliminated in the present process.

The present process is particularly effective where a CAA pretreat is operated so as to remove the acetylenes to very low levels. To do this higher temperature and/or higher stripping gas rates are required in the acetylene stripper to obtain low levels of acetylene in the CAA recycled to the absorption step. At these higher temperatures more water is carried overhead concentrating the solvent undesirably. The present process, therefore returns this water to the CAA solution in an economic and simple manner. Further, in the absence of the present process the ammonia recovery vessels must be considerably enlarged to handle the additional water and ammonia taken overhead due to the higher temperatures. Additionally, as discussed above the present ammonia recovery system for the pretreat section positively eliminates any contamination of the main butadiene extraction section with acetylenes from the pretreat section due to a common ammonia recovery fractionator.

It has now been discovered that higher than conventional concentrations of ammonia in the water recycled to the scrubber may be used with only negligible losses of ammonia. Thus, although the concentration of ammonia in the acetylene gas sent to flare is higher than in the prior art system the total number of mols of hydrocarbon vapor being scrubbed is small so that the total loss of ammonia is comparatively insignificant.

The present invention will be more clearly understood from a consideration of the accompanying figure representing a schematic flow plan of a preferred ammonia recovery system.

The cuprous ammonium acetate pretreat solution is prepared by reacting an ammonium acetate solution with copper shot in a tower together with a controlled amount of air. The composition of the cuprous ammonium acetate is preferably maintained within the following range for best efficiency:

| Component | Moles/liter | | |
|---|---|---|---|
| | Minimum | Maximum | Preferred |
| Cupric ion | 0.2 | 0.6 | 0.4 |
| Cuprous ion | 1.5 | 2.7 | 2.0 |
| Acetate ion | 5.5 | 6.5 | 6.0 |
| Ammonia | 9.5 | 11.5 | 10.6 |

Treating weight ratios of cuprous ammonium acetate solution to $C_4$ feed should be in the range of 1/1 to 1/3, preferably 1/2.0. Treating temperatures should be in the range of 30° F. to 50° F., preferably 40° F., pressures to maintain the hydrocarbons in the liquid phase, preferably 80 p.s.i.g. to 100 p.s.i.g., e.g. 90 p.s.i.g., and contacting times in the range of 15 min. to 30 min., preferably 25 min. Other conditions may, of course, also be used.

Turning now to the figure, in a preferred embodiment the rich CAA solution, after (if desired) desorption and recovery, of the small amounts of butadiene absorbed with the acetylenes, is passed through line 1 to heater 2 where its temperature is raised to 190° F. to 230° F., preferably 220° F. The pressure of this stream is preferably 45 to 55 p.s.i.g., e.g. 50 p.s.i.g. Concentrated ammonia vapor recovered from the ammonia concentration single stage flash as will be described is injected through line 3 into line 4 and the combined stream is flashed in flash drum 5 to a pressure of preferably 6 to 10 p.s.i.g., e.g. Alternatively, this vapor may be supplied directly to the drum 5 through valved line 3a to act as a stripping gas.

It should be noted that alternatively to using a single flash stage a number of stages may be used or, less preferably, one or more distillation columns without flashing to lower pressures. A description of a preferred system for removing acetylenes from the fat CAA in a series of flash vaporization stages is described in S.N. 814,488 filed May 20, 1959, now U.S. Patent 2,983,772 issued May 9, 1961. The liquid lean CAA solution is taken from the bottom of flash drum 5 and is recycled to the absorption stage(s) through line 6. From the top of the flash drum 5 (or if more than one successive separation of acetylenes is used, from the top of all of these columns) the desorbed acetylenes along with the ammonia and water vapor is passed through line 7 to a knock-out drum 8 utilized to remove any entrained liquid CAA solution. From the top of this knock-out drum the vapors are passed through line 9 and are cooled to a temperature of about 100 to 180° F., preferably 130 to 170° F., e.g. 150° F., and most of the ammonia and water condensed by a cool liquid ammonia water stream supplied through line 10. The combined liquid vapor stream is supplied through line 11 to another drum 12 wherein the vapors are separated from the liquid and the vapor is passed overhead to ammonia scrubber column 13. A water stream containing 3 to 10 mol percent ammonia, preferably 4 to 6 mol percent ammonia, e.g. 5 mol percent ammonia at a temperature of 60 to 120° F., preferably 80 to 100° F., e.g. 90° F. is supplied to the top of this scrubbing column through line 14. The scrubbed acetylene hydrocarbon stream containing 10 to 50 mol percent, e.g. 25 mol percent $NH_3$ is passed to flare through line 15 at a pressure of about 0 to 8 p.s.i.g., preferably 1 to 4 p.s.i.g., e.g. 2 p.s.i.g. The ammonia is rich scrubbing liquid from the bottom of the column at a temperature of 100 to 170° F., preferably 140 to 160° F., e.g. 150° F. enters the drum 12 previously mentioned where it mixes with the liquid ammonia water supplied as coolant and condensed ammonia and water previously described. The combined stream is removed from drum 12 by line 16. This stream contains approximately 10 to 20 mol percent, preferably 13 to 17 mol percent, e.g. 15 mol percent ammonia and traces of acetylenes. Said stream is passed through pump 17, where its pressure is increased to preferably 35 to 60 p.s.i.g., e.g. 40 p.s.i.g., to line 18 where a portion of the stream is recyled through line 19 to cooler 20. Here the stream is cooled to 100 to 120° F., preferably 80 to 100° F., e.g. 90° F., before being passed back to line 10 as previously described. The remainder of the stream is passed through line 21 to single stage flash ammonia concentration drum 22 equipped with steam coil 23. The temperature of the liquid in the flash concentration vessel is in the range of 200 to 300° F., preferably 220 to 260° F., e.g. 250° F. An aqueous water stream having reduced concentration of ammonia is taken from the bottom of drum 22 and is passed through line 24, cooler 25, back to line 14, as previously described. The overhead concentrated vapors from the flash vaporization are passed through line 3 back to join the acetylene rich CAA solution in line 4 as previously described. The concentration of this ammonia stream is 20 to 60 mol percent, preferably 35 to 45 mol percent, e.g. 40 mol percent ammonia.

The present invention will be more clearly understood from a consideration of the following example.

*Example*

16,000 lbs./hour of an acetylene-rich CAA solution containing after desorption of butadiene 40 lbs./hour acetylenes is passed to the system described in the figure. The aqueous CAA solution composition in moles per liter is as follows.

Cupric ion _____ 0.4
Cuprous ion _____ 2.0
Acetate ion _____ 6.0
Ammonia _____ 10.6

The lean CAA solution after flashing from 50 p.s.i.g. to 10 p.s.i.g. at a temperature of 220° F. contains 300 p.p.m. acetylenes. The composition of the stream taken overhead from drum 5 is .5 mol percent acetylenes, .5 mol percent butadiene, 40 mol percent ammonia, 59 mol percent water, and amounts to 2600 lbs./hour. This stream is cooled to 150° F. with 34,000 lbs./hour of a 15 mol percent liquid ammonia water stream supplied at 90° F. 460 lbs./hour of the vapor stream is passed to the absorption column and 6300 lbs./hour of a 5 mol percent ammonia solution is supplied at 90° F. to the top of the tower. The acetylene rich stream leaving the top of the tower amounts to 90 lbs./hour and contains 20 mol percent ammonia. Thus the loss of ammonia is only 0.4 mol $NH_3$/hour=approximately $12/day. The enriched ammonia liquid from the bottom of the tower at a temperature of 15° F. contains 10 mol percent ammonia and traces of acetylenes, and amounts to 6670 lbs./hour. The stream passed to the single stage ammonia flash concentration contains 15 mol percent ammonia and traces of acetylenes and amounts to 8800 lbs./hour. The temperature of the liquid in the ammonia flash concentration is 250° F. and the flash is at 35 p.s.i.g. The amount of the overhead vapors from this flash concentration amounts to 2500 lbs./hour, and the composition of the stream is 40 mol percent ammonia. This stream is recycled through line 3 to line 4.

It is to be understood that this invention is not limited to the specific example, which has been offered merely as an illustration, and that modifications may be made without departing from the spirit of this invention.

What is claimed is:

1. In a cuprous ammonium acetate pretreat process for the removal of acetylenes from butadiene wherein the acetylenes are selectively absorbed in the cuprous ammonium acetate solution, and the said solution containing absorbed acetylenes is regenerated by heating to desorb the acetylenes and minor amounts of ammonia overhead, the improvement which comprises scrubbing the said gases desorbed overhead with water containing more than 3 mol percent ammonia in an ammonia scrubber to selectively recover ammonia, passing ammonia rich water from the bottom of the scrubber to a single stage flash vaporization operated at a temperature in the range of 200 to 300° F., recycling concentrated ammonia vapors flashed overhead back to the acetylene desorption heating step and passing the liquid water having a reduced ammonia concentration to the ammonia scrubber.

2. The process of claim 1 in which the acetylenes and minor amounts of ammonia desorbed overhead from the cuprous ammonium acetate solution are mixed with cooled ammonia rich water from the bottom of the ammonia scrubber, are separated from said water, and are then supplied to the ammonia scrubber at a temperature in the range of 130 to 170° F.

3. The process of claim 1 in which the ammonia lean water is supplied to the top of the scrubber at a temperature in the range of 80 to 120° F. and the ammonia rich water from the bottom of the column leaves at a temperature in the range of 100 to 170° F.

4. The process of claim 1 in which the temperature in the single stage flash vaporization is 220 to 260° F. and the pressure is 20 to 50 p.s.i.g.

5. The process of claim 1 in which the concentrated ammonia vapors recycled are mixed with the cuprous ammonium acetate solution containing absorbed acetylenes passed to the acetylene desorption heating step.

6. The process of claim 1 in which the concentrated ammonia vapors recycled are supplied directly as a stripping gas to the acetylene desorption heating step.

7. The process of claim 1 in which the conditions in the single stage flash vaporization are adjusted so that the concentration of the $NH_3$ vapors flashed overhead and recycled is approximately equal to the concentration of the $NH_3$ water vapors in equilibrium with the cuprous ammonium acetate solution in the acetylene desorption heating step.

References Cited by the Examiner

UNITED STATES PATENTS

| | | | |
|---|---|---|---|
| 2,384,902 | 9/45 | Fasce | 260—683.15 X |
| 2,430,972 | 11/47 | Black et al. | 260—681.5 |
| 2,453,853 | 11/48 | Morrell et al. | 260—681.5 |
| 2,549,555 | 4/51 | Wilson | 260—681.5 |
| 2,788,378 | 4/57 | Cotton et al. | 260—681.5 |
| 2,870,232 | 1/59 | Wilson et al. | 260—681.5 |

FOREIGN PATENTS 322,049   11/29   Great Britain.

ALPHONSO D. SULLIVAN, *Primary Examiner.*